(12) United States Patent
Okumura

(10) Patent No.: US 6,687,647 B2
(45) Date of Patent: Feb. 3, 2004

(54) ROTATION-ANGLE DETECTING DEVICE CAPABLE OF PRECISELY DETECTING ABSOLUTE ANGLE

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/378,031

(22) Filed: Feb. 27, 2003

(65) Prior Publication Data
US 2003/0171891 A1 Sep. 11, 2003

(30) Foreign Application Priority Data
Mar. 5, 2002 (JP) ........................................ 2002-058811

(51) Int. Cl.$^7$ ............................. G01B 7/30; G01B 21/22
(52) U.S. Cl. ................. 702/163; 324/207.2; 324/207.25
(58) Field of Search ............................... 702/163, 151; 324/207.2–207.25, 165, 166, 173, 174, 207.15, 207.16, 207.17

(56) References Cited

U.S. PATENT DOCUMENTS 5,065,095 A * 11/1991 Suzuki ................. 324/207.25
6,324,905 B2 * 12/2001 Noltemeyer et al. ........ 73/865.9
6,424,147 B1 * 7/2002 Kato et al. ................ 324/207.2
6,456,065 B2 * 9/2002 Hoshi et al. ........... 324/207.25

* cited by examiner

Primary Examiner—John Barlow
Assistant Examiner—Hien Vo
(74) Attorney, Agent, or Firm—Beyer Weaver & Thomas, LLP (57) ABSTRACT

The absolute angle of the rotation angle is detected on the basis of a first detection signal including sawtooth continuous pulses and a second detection signal that rises stepwise. The second detection signal includes a plurality of flat portions and a plurality of gradually rising portions that link the flat portions, corresponding to the pulses of the first detection signal. Each gradually rising portion corresponds to the sharply falling portion of the first detection signal. When the value of the second detection signal is included in a flat portion, the absolute angle is found based on the first and second detection signals, and, when the value of the second detection signal is included in a gradually rising portion, the absolute angle is found based on the first detection signal in conjunction with the second detection signal corresponding to a flat portion preceding or following the gradually rising region.

4 Claims, 6 Drawing Sheets

ROTATION-ANGLE DETECTING DEVICE CAPABLE OF PRECISELY DETECTING ABSOLUTE ANGLE

BACKGROUND OF THE INVENTION

1. Field of the Invention

The present invention relates to rotation-angle detecting devices, and more particularly, to a rotation-angle detecting device that is connected to a rotating member, for example, a steering shaft of an automobile, to precisely detect the rotation angle of the steering wheel.

2. Description of the Related Art

Figure 7:
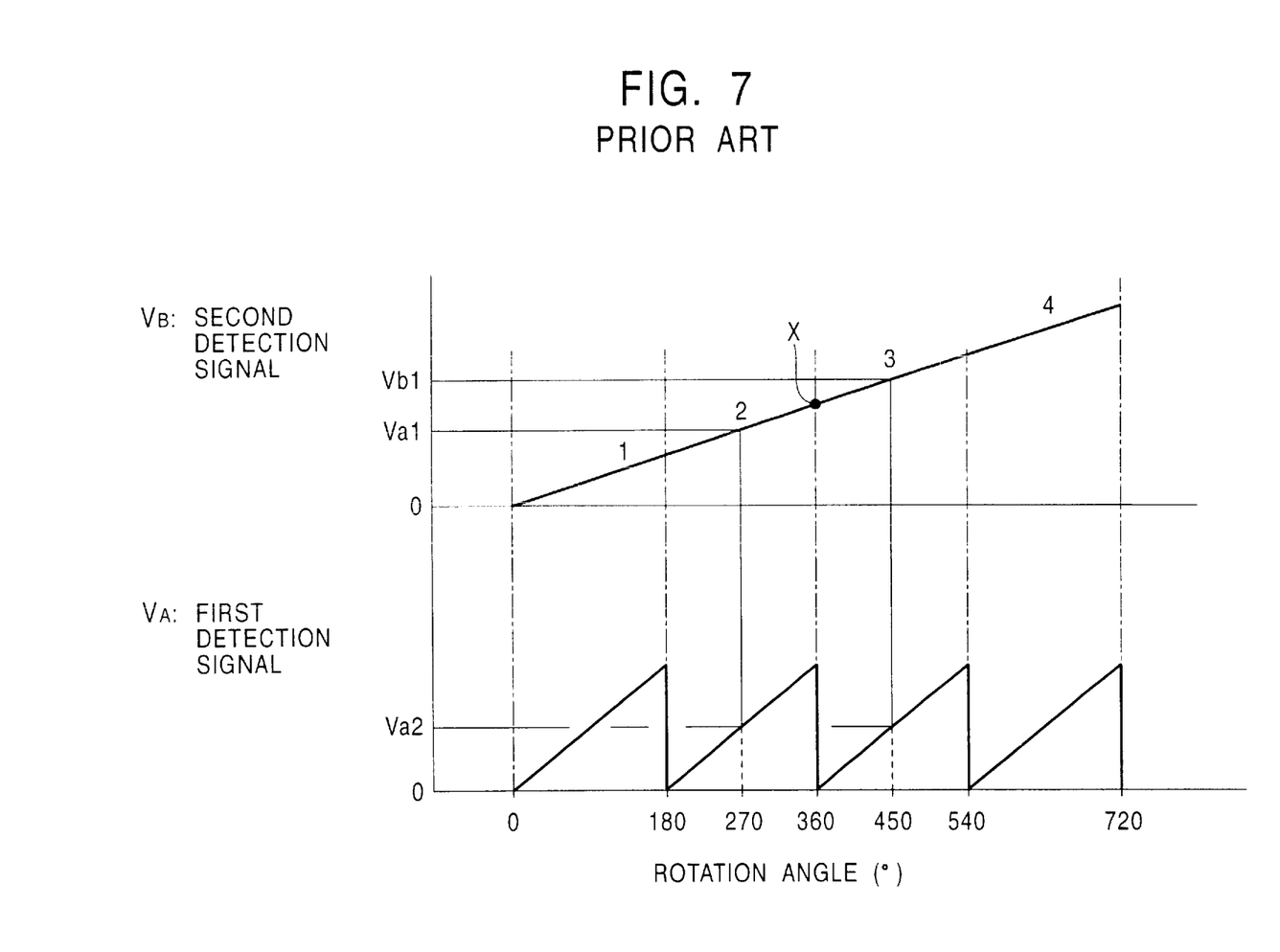
FIG. 7 is an explanatory view showing the measurement of the rotation angle by a known rotation-angle detecting device.

A known type of rotation-angle detecting device will be described with reference to FIG. 7. FIG. 7 is an explanatory view showing the measurement of the rotation angle by the known rotation-angle detecting device.

In order to detect the rotation angle as an absolute angle in the known rotation-angle detecting device, a first detection signal VA in the form of a periodic sawtooth wave including gradually rising portions and sharply falling portions, and a second detection signal VB that gradually and linearly rises within the detection range are used, as shown in FIG. 7. The second detection signal VB is equally divided into n-number of regions corresponding to the periods of the sawtooth first detection signal VA (n is 4 in FIG. 7). When the second detection signal VB shows a value Va1 for a certain rotation angle, the value Va1 is included in Region 2 in FIG. 7. Furthermore, when the first detection signal VA shows a value Va2 in this case, the detection angle is 180°+90°, that is, 270°. When the second detection signal VB shows a value Vb1, the value Vb1 is included in Region 3. In this case, even if the first detection signal VA is Va2, the detection angle is 360°+90°, that is, 450°.

However, on the boundaries between the n-number of equally divided regions of the second detection signal VB, it is uncertain whether the value of the second detection signal VB is included in the higher region or in the lower region, because of measurement errors, tolerances, and the like (Point X in FIG. 7). The first detection signal VA sharply falls corresponding to the boundaries. In some cases, even when the value of the second detection signal VB is included in the higher region, the first detection signal VA may show a high value. In this case, it is supposed that the rotation angle will be wrongly judged at 360°+175°, although it should be 180°+175°. In order to prevent such wrong judgement, for example, continuity is checked, that is, when the rotation angle that should be 180°+175° is wrongly judged at 360°+175°, since the detected value is separate from the preceding detected value, this detection is judged wrong, and detection is performed again. However, a complicated flow is necessary for checking of such wrong detection, and much calculation time is required.

SUMMARY OF THE INVENTION

Accordingly, it is an object of the present invention to provide a rotation-angle detecting device that can easily and precisely detect the absolute angle.

In order to achieve the above object, according to an aspect, the present invention provides a rotation-angle detecting device for detecting the absolute angle based on a first detection signal that includes sawtooth continuous pulses, each having a portion that gradually and linearly rises and a portion that sharply falls within a detection range, and a second detection signal that rises or falls stepwise within the detection range, wherein the second detection signal includes, corresponding to the pulses of the first detection signal, a plurality of flat portions and a plurality of gradually rising or falling portions for linking the flat portions, and each of the gradually rising or falling portions corresponds to the sharply falling portion of the first detection signal, wherein, when the value of the second detection signal is included in any of the flat portions, the absolute angle is found on the basis of the first detection signal and the second detection signal, and, when the value of the second detection signal is included in any of the gradually rising or falling portions, the absolute angle is found on the basis of the first detection signal in conjunction with the second detection signal corresponding to a flat portion preceding or following the gradually rising or falling region.

Since the second detection signal rises stepwise, the absolute angle can be found while discriminating between a region in which the absolute angle can be calculated from the first detection signal and an uncertain region in which determination is uncertain. Moreover, in the uncertain region, it is possible to determine whether the preceding portion or the following portion is used to find the absolute angle on the basis of the first detection signal. Therefore, the absolute angle can be easily and precisely detected even in the uncertain region.

Preferably, when the value of the second detection signal is included in a gradually rising or falling portion that links the N-th flat portion and the N+1-th flat portion, a value of the first detection signal is detected corresponding thereto. When the first detection signal is higher than a predetermined upper threshold, the absolute angle is found on the basis of an angle set corresponding to the N-th flat portion and an angle set corresponding to the first detection signal. When the first detection signal is lower than a predetermined lower threshold, the absolute angle is found on the basis of an angle set corresponding to the N+1-th flat portion and an angle set corresponding to the first detection signal. When the value of the first detection signal is equal to the upper threshold or the lower threshold or is therebetween, an angle corresponding to the first detection signal is set at 0, and an angle set corresponding to the N+1-th flat portion is considered as the absolute angle.

In this case, since calculation is performed only depending on the first detection signal, the absolute angle can be detected easily and precisely.

Preferably, when the value of the second detection signal is included in the gradually rising or falling portion that links the N-th flat portion and the N+1-th flat portion, the value of the first detection signal is detected corresponding thereto, and the absolute angle is given by an expression $N \times \Theta a - \Theta 0 + B$ when the value of the first detection signal is higher than the upper threshold, by an expression $(N+1) \times \Theta a - \Theta 0 + B$ when the value of the first detection signal is lower than the lower threshold, and by an expression $(N+1) \times \Theta a - \Theta 0$ when the value of the first detection signal is more than or equal to the lower threshold and is less than or equal to the upper threshold.

Herein, N is an integer, B represents the angle calculated from the first detection signal, $\Theta a$ represents the rotation angle range set corresponding to the flat portion, $\Theta 0$ represents an arbitrary rotation angle, the upper threshold is an upper threshold of the first detection signal corresponding to the lower end of the gradually rising or falling portion of the second detection signal, and the lower threshold is a lower threshold of the first detection signal corresponding to the upper end of the gradually rising or falling portion of the second detection signal.

In this case, since calculation is performed only depending on the first detection signal, the absolute angle can be detected easily and precisely.

According to another aspect, the present invention provides a rotation-angle detecting device for detecting the absolute angle based on a first detection signal that includes sawtooth continuous pulses, each having a portion that gradually and linearly rises and a portion that sharply falls within a detection range, and a second detection signal that rises or falls stepwise within the detection range, wherein the second detection signal includes, corresponding to the pulses of the first detection signal, a plurality of flat portions and a plurality of gradually rising or falling portions for linking the flat portions, and each of the gradually rising or falling portions corresponds to the sharply falling portion of the first detection signal, wherein, when the value of the second detection signal is included in any of the flat portions, the absolute angle is found on the basis of the first detection signal and the second detection signal, and, when the value of the second detection signal is included in any of the gradually rising or falling portions, the absolute angle is found on the basis of the value of the second detection signal in the gradually rising or falling portion.

In this case, when the value of the second detection signal is included in the gradually rising or falling portion, the absolute angle is calculated from the second detection signal in the gradually rising or falling portion, and therefore, the absolute angle can be detected easily and precisely.

Further objects, features, and advantages of the present invention will become apparent from the following description of the preferred embodiments with reference to the attached drawings.

DESCRIPTION OF THE PREFERRED EMBODIMENTS

A rotation-angle detecting device according to an embodiment of the present invention will be described below with reference to FIGS. 1 to 6.

The rotation-angle detecting device of this embodiment has an upper case 1 made of insulating resin and shaped like a disk having a center hole 1a. The upper case 1 has a stepped portion 1b on its outer periphery. A lead-wire extending portion 4 is formed at an end of the upper side of the upper case 1, and lead wires 5 extend outside therefrom.

A lower case 2 includes a bottom plate 2b shaped like a disk having a center hole 2a, and a side wall 2d. The bottom plate 2b has a ring-shaped projecting portion 2c. A stepped portion 2e is formed at the upper end of the side wall 2d, and is engaged with the stepped portion 1b of the upper case 1. The upper case 1 and the lower case 2 are fastened together by a screw 1c.

A rotor 3 is made of insulating resin and shaped like a cylinder. Ribs 3a to be engaged with an external rotating shaft are formed on the inner periphery of the rotor 3. The rotor 3 also has two intermittent teeth 3b formed on the upper outer periphery thereof on the opposing sides spaced 180° apart from each other, and teeth 3c formed on the entirety of the lower outer periphery. The rotor 3 is held between the upper case 1 and the lower case 2 so that it can rotate clockwise and counterclockwise relative to the upper case 1 and the lower case 2.

A gear 6 is a general type of gear that is made of insulating resin and that is provided with teeth 6c on its entire periphery. A projection 6a is formed at the center of one side face of the gear 6, and a circular recess 6b is formed at the center of the other side face. The teeth 6c of the gear 6 are engaged with the teeth 3c formed on the lower periphery of the rotor 3. The gear 6 rotates 360° while the rotor 3 rotates 180°.

A gear 7 is a double gear that is made of insulating resin and that includes two upper and lower tooth segments placed in the axial direction so that upper teeth 7c and lower teeth 7d are alternately arranged. The teeth 7c and 7d are formed on the entire periphery. A projection 7a is formed at the center of one side face of the gear 7, and a circular recess 7b is formed at the center of the other side face. The upper teeth 7c and the lower teeth 7d of the gear 7 are to be engaged with the intermittent teeth 3b formed on the upper side of the outer periphery of the rotor 3.

Two ring-shaped magnets 8 each have different magnetic poles that oppose each other at the positions spaced 180° apart from each other, and are fixedly mounted inside the teeth of the gear 6 and the gear 7, respectively.

Two support members 9 are formed of a plate made of insulating resin. Both ends in the longitudinal direction thereof are inclined downward, and are fixed to the lower case 2. Ring-shaped projections 9a are respectively formed on the lower sides of the support members 9. The projection 6a formed on one side face of the gear 6 is fitted in the ring-shaped projection 9a of one of the support members 9, and the circular recess 6a on the other side face is fitted on the ring-shaped projection 2c of the bottom plate 2b of the lower case 2, so that the gear 6 is rotatably supported while being retained from both the sides. The projection 7a formed on one side face of the gear 7 is fitted in the ring-shaped projection 9a of the other support member 9, and the circular recess 7a on the other side face is fitted on the ring-shaped projection 2c of the bottom plate 2b of the lower case 2, so that the gear 7 is also rotatably supported while being retained from both the sides.

A printed wiring board 10 is shaped like a disk having a circular hole 10a at its center, and is fixed to the lower side of the upper case 1. The output from the printed wiring board 10 is led outside by the lead wires 5 through the lead-wire extending portion 4.

Figure 6:
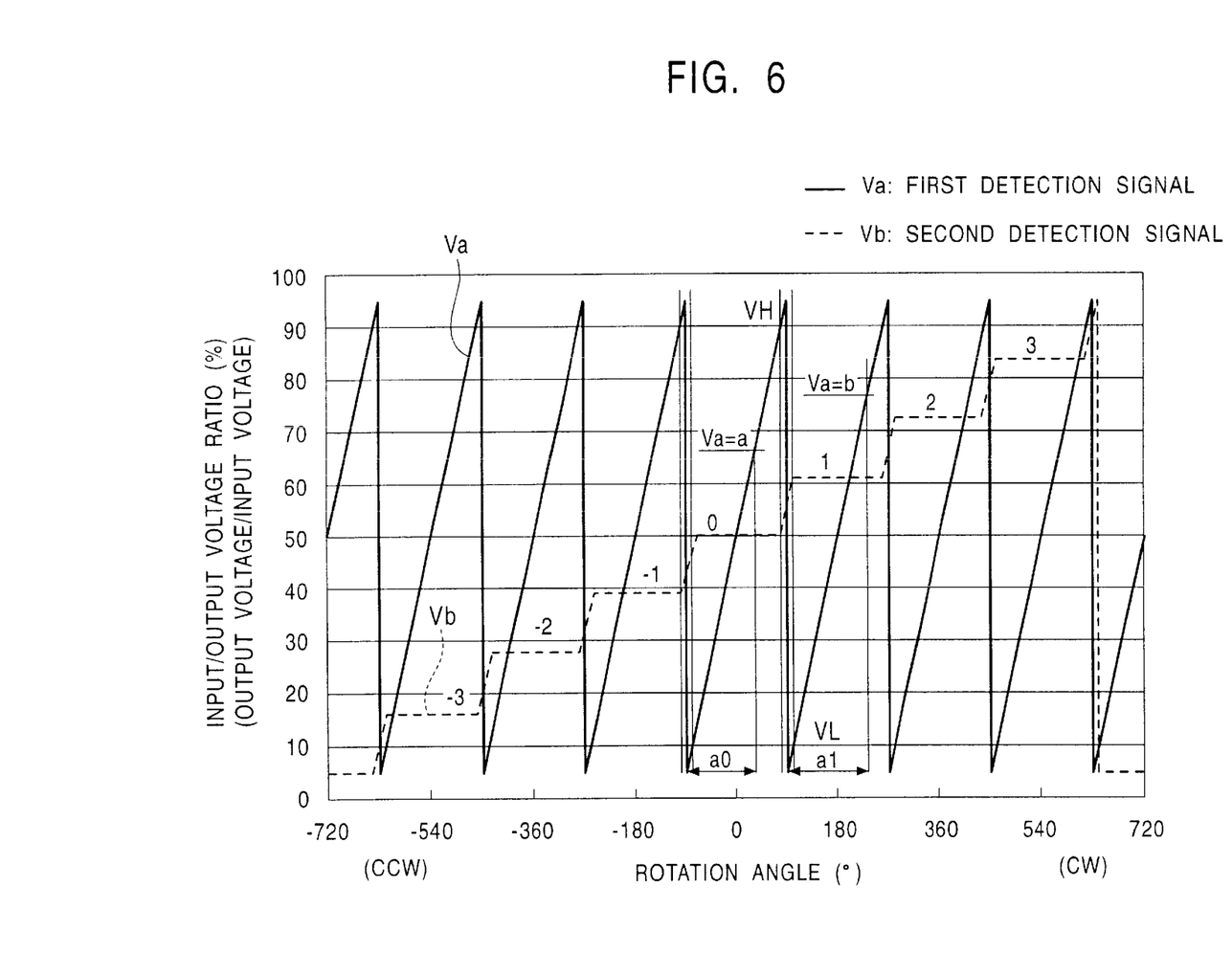
FIG. 6 is an explanatory view showing the relationship between first and second detection signals and the rotation angle in the rotation-angle detecting device.

Magnetoelectric transducers 11 are each formed of an assembly of a plurality of giant magnetoresistive (GMR) elements, and the GMR elements form a bridge circuit (not shown). The magnetoelectric transducers 11 are mounted on the printed wiring board 10 so that they oppose the ring-shaped permanent magnets 8 that corotate with the gears 6 and 7. As shown in FIG. 6, a sawtooth periodic detection signal is obtained from the magnetoelectric transducer 11 corresponding to the gear 6, and a detection signal that rises stepwise is obtained from the magnetoelectric transducer 11 corresponding to the gear 7.

The engagement between the double gear 7 and the intermittent teeth 3b formed on the outer periphery of the rotor 3 will now be described with reference to FIG. 5.

Figure 1:
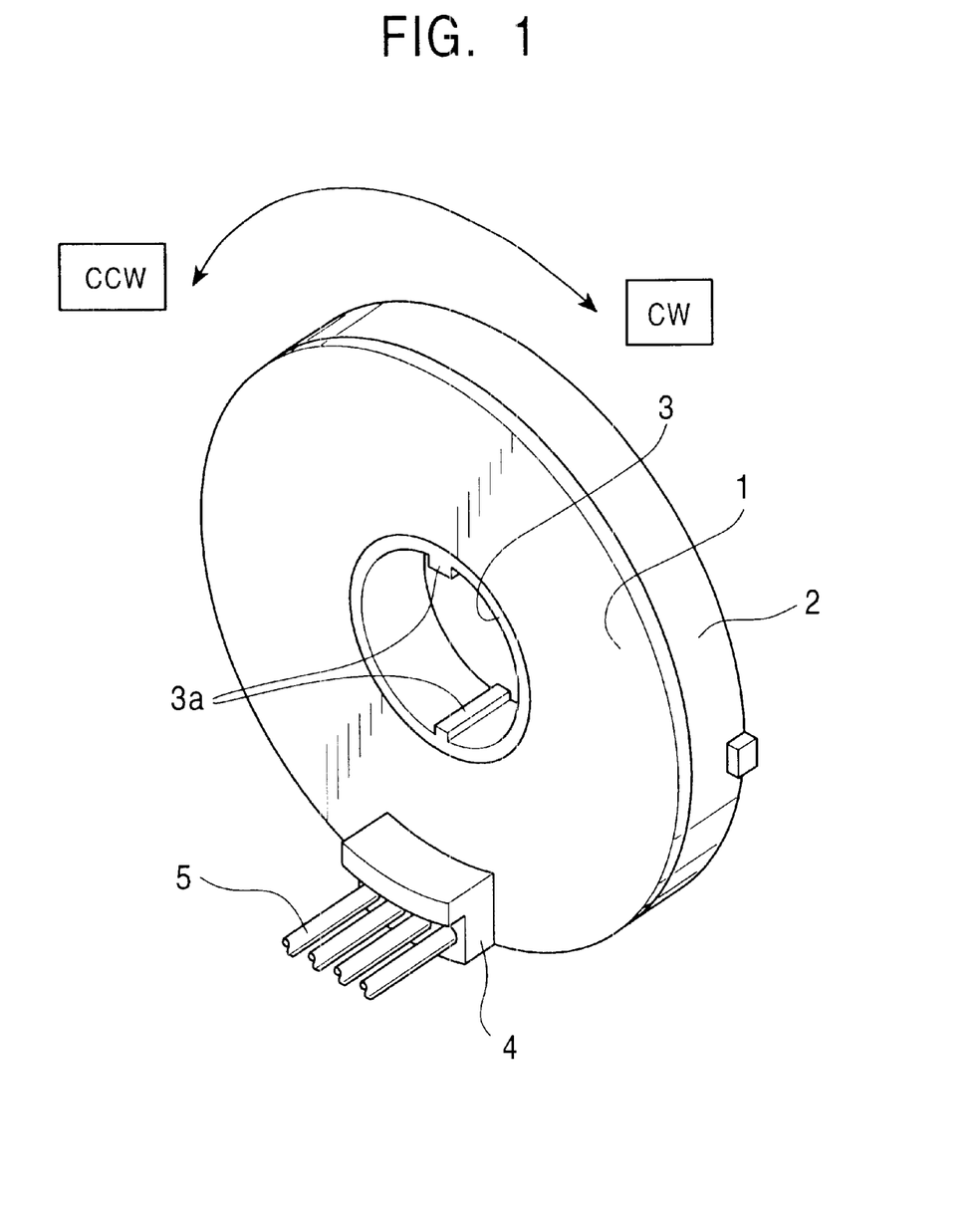
FIG. 1 is a perspective view of a rotation-angle detecting device according to an embodiment of the present invention.
Figure 2:
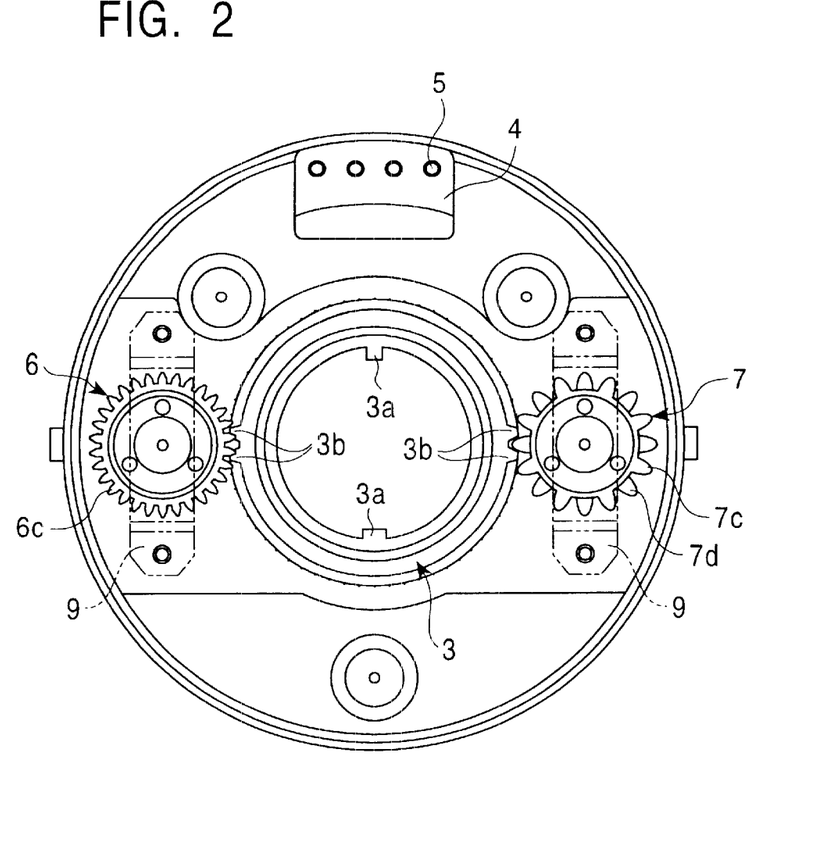
FIG. 2 is a plan view of the rotation-angle detecting device.
Figure 3:
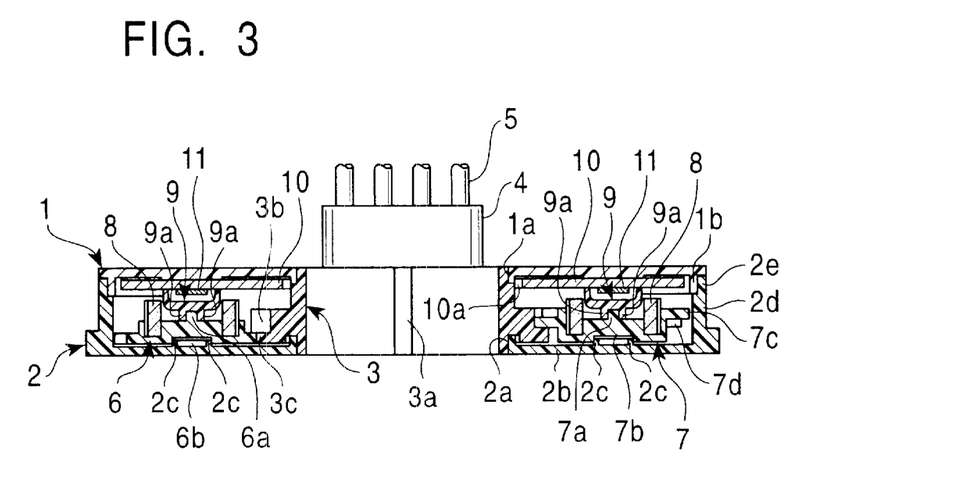
FIG. 3 is a cross-sectional view of the rotation-angle detecting device.
Figure 4:
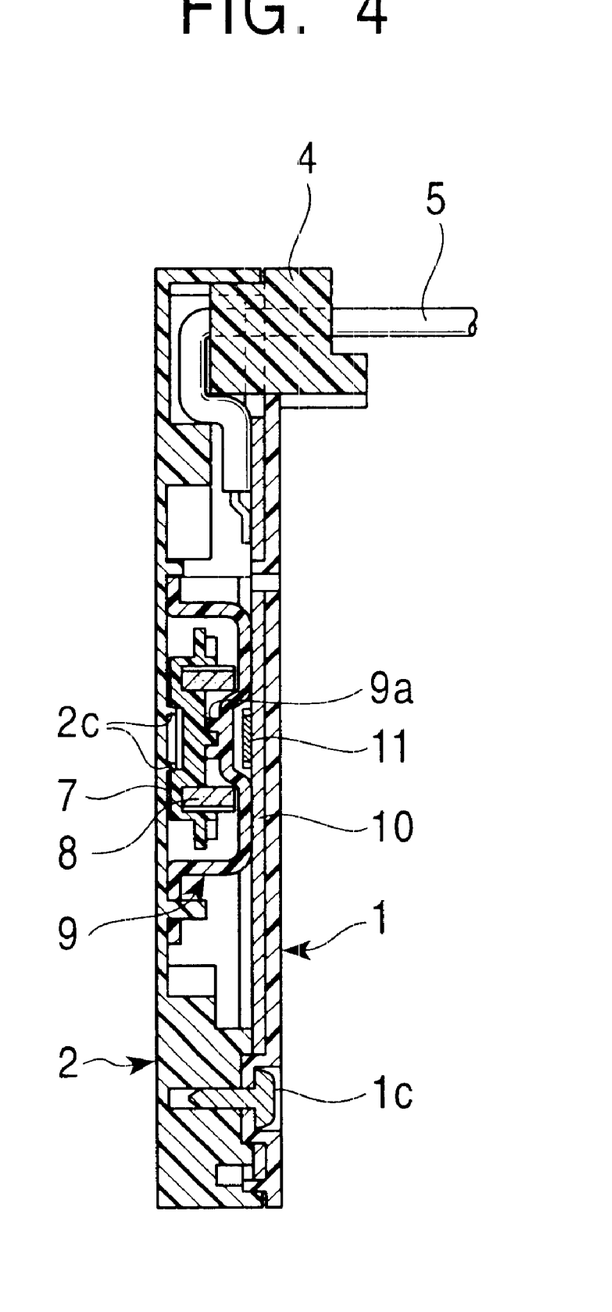
FIG. 4 is a cross-sectional view showing the principal parts of the rotation-angle detecting device.
Figure 5A:
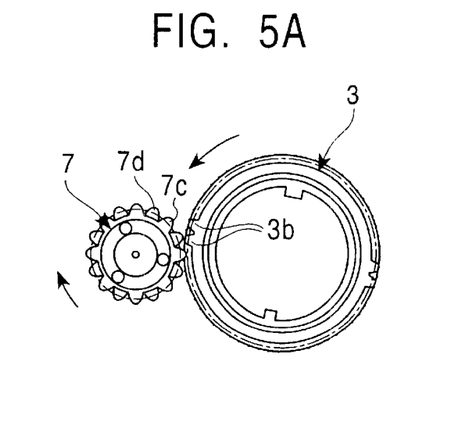
FIGS. 5A to 5E are explanatory views showing the engagement of intermittent teeth and a double gear in the rotation-angle detecting device.
Figure 5B:
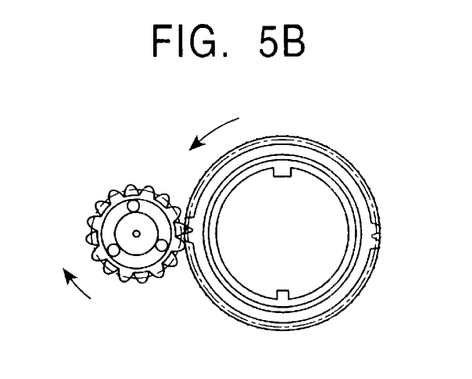
Figure 5C:
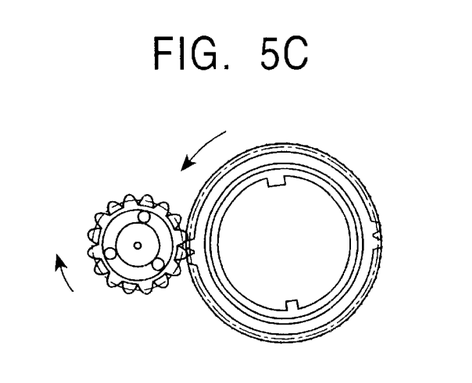
Figure 5D:
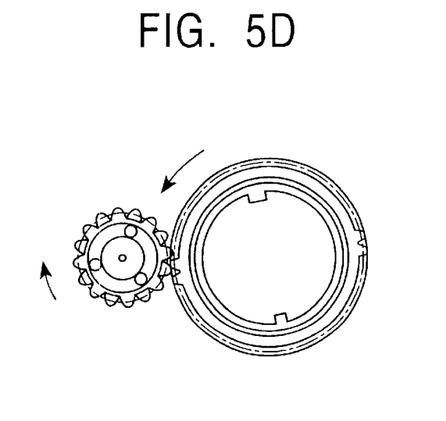
Figure 5E:
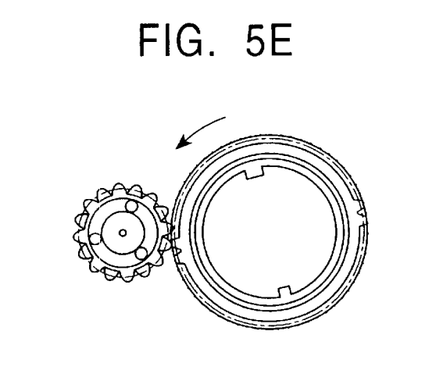

In FIG. 5A, when the rotor 3 rotates counterclockwise (in the direction shown by the arrow in the figure), the outside of the preceding tooth 3b of the intermittent teeth 3b hits an upper tooth 7c of the gear 7, and the gear 7 slightly rotates clockwise (in the direction shown by the arrow in the figure). In FIG. 5B, a lower teeth 7d of the gear 7 enters a space between the intermittent teeth 3b, and is pressed by the wall of the following tooth, so that the gear 7 starts to further rotate clockwise. In FIGS. 5C and 5D, since the lower tooth 7d of the gear 7 is continuously pressed, the gear 7 further rotates clockwise. With this rotation, the lower tooth 7d is coming out of the space between the intermittent teeth 3b. In FIG. 5E, the lower tooth 7d is completely out of the space. In this case, the lower tooth 7d and the leading end of a lower tooth 7d on the upstream side in the rotating direction contact the peripheral surface of the rotor 3 connected to the space between the teeth 3c, thereby preventing the gear 7 from further rotating. In this way, the gear 7 rotates by a predetermined angle.(an angle corresponding to one pitch of the upper teeth 7c or the lower teeth 7d).

Subsequently, the gear 7 does not rotate until the rotor 3 has rotated approximately 180°. When the rotor 3 has rotated approximately 180°, the other intermittent teeth 3b spaced 180° apart in the rotor 3 are brought into contact with an upper tooth 7c of the gear 7, and the same rotation as above is performed. Therefore, the gear 7 rotates by a predetermined angle (an angle corresponding to one pitch of the upper teeth 7c or the lower teeth 7d) every time the rotor 3 rotates 180°.

A description will now be given of detection signals and a method for measuring the rotation angle on the basis of the detection signals in the rotation-angle detecting device. In FIG. 6, detection signals are shown in the form of the ratio of the output voltage to the input voltage to the magnetoelectric transducer 11, and the rotation angles in the clockwise and counterclockwise directions are also shown. Referring to FIG. 6, a first detection signal Va includes sawtooth pulses having a period of 180°, and each of the pulses includes a portion that gradually and linearly rises, and a portion that falls sharply. The portion that gradually and linearly rises is obtained by calculating, with an arithmetic element (not shown) mounted on the printed wiring board 10, a sine-wave output and a cosine-wave output from the bridge circuit in the magnetoelectric transducer 11 in conjunction with the ring-shaped permanent magnet 8 that corotates with the gear 6, and converting the calculated value into an output value that is linear with respect to the rotation angle of the rotor 3. The portion that sharply falls is a portion in which one period of the first detection signal Va ends and the first detection signal Va returns to its initial value.

A second detection signal Vb has a waveform that rises stepwise at every 180°. The intermittent teeth 3b are spaced 180° apart from each other in the rotating direction on the periphery of the rotor 3, and the double gear 7 to be meshed with the intermittent teeth 3b of the rotor 3 is rotated by a predetermined angle by the intermittent teeth 3b every time the rotor 3 rotates 180°. When the gear 7 is rotated by the predetermined angle, the output from the bridge circuit in the magnetoelectric transducer 11 is changed by the permanent magnet 8 that corotates with the gear 7, and an increase corresponding to a stepwise rise of the second detection signal vb is found by calculation. The signal rises stepwise at every 180°, that is, every time the intermittent teeth 3b of the rotor 3 and the gear 7 are engaged with each other.

The center of the gradually rising portion of the second detection signal Vb corresponds to the sharply rising portion of the first detection signal Va. The flat portion of the second detection signal Vb links gradually rising portions. The position number of the flat portion is shown by the numeral in FIG. 6. The center of the 0-th flat portion corresponds to a rotation angle of 0°.

A method for calculating an absolute angle A will be described below with reference to FIG. 6. In the following description, N is an integer, B is an angle calculated from a portion of the first detection signal Va that gradually and linearly rises, VH is an upper threshold of the first detection signal Va corresponding to the lower end of a gradually rising portion of the second detection signal Vb, VL is a lower threshold of the first detection signal Va corresponding to the upper end of a gradually rising portion of the second detection signal Vb, $\Theta a$ is a rotation angle range set corresponding to each flat portion (a rotation angle range corresponding to one period of the first detection signal: 180° in this embodiment), and $\Theta 0$ is an arbitrary rotation angle (90° in this embodiment).

When the value of the second detection signal Vb is included in the 0-th flat portion (N=0), first, a rotation angle range a0 is found on the basis of the value of the first detection signal Va (Va=a). Next, a rotation angle range $\Theta a$ corresponding to the flat portion and an arbitrary rotation angle $\Theta 0$ (the amount of offset of the first detection signal from the reference position) are set. Since $\Theta a$ is 180° and $\Theta 0$ is 90° in FIG. 6, an absolute angle A (°) is given by an expression 180×0−90+a0=a0−90.

When the value of the second detection signal Vb is included in the first (N=1) flat portion, first, the rotation angle range a1 is found on the basis of the first detection-signal Va (Va=b), and the rotation angle range $\Theta a$ corresponding to the flat portion and an arbitrary rotation angle $\Theta 0$ are then set, in a manner similar to the above. The absolute angle A (°) is given by an expression 180×1−90+a1=90+a1.

A description will now be given of a case in which the value of the second detection signal Vb is included in a gradually rising portion between the 0-th (N=0) flat portion and the first (N=1) flat portion. A value of the first detection signal Va set corresponding to the lower end of the gradually rising potion is designated VH, and a value of the first detection signal Va set corresponding to the upper end of the gradually rising portion is designated VL. When the value of the first detection signal Va is higher than VH, a rotation angle range B is first found on the basis of the first detection signal Va. A rotation angle range $\Theta a$ corresponding to the flat portion and an arbitrary rotation angle $\Theta 0$ are set in a manner similar to the above, and an absolute angle A in the 0-th (N=0) portion is found. The absolute angle A (°) is given by an expression 180×0−90+B=B−90.

When the value of the first detection signal Va is lower than VL, a rotation angle range B is similarly found on the basis of the value of the first detection signal Va. However, the absolute angle A is found corresponding to the next first (N=1) portion. That is, after a rotation angle range $\Theta a$ corresponding to the flat portion and an arbitrary rotation angle $\Theta 0$ are set, the absolute angle A (°) is given by an expression 180×1−90+B=B+90.

When the value of the first detection signal Va is higher than or equal to VL and is lower than or equal to VH, the rotation angle range B is set at 0 on the basis of the first detection signal Va, and the absolute angle A is found corresponding to the next first (N=1) portion. The absolute angle A (°) is given by an expression 180×1−90+0=90.

In general, when the value of the second detection signal Vb is included in a gradually rising portion that links the N-th flat portion and the N+1-th flat portion, the first detection signal Va is detected corresponding thereto. When the value va is higher than VH, the absolute angle A (°) is given by an expression N×Θa−Θ0+B. When the value Va is lower than VL, the absolute angle A (°) is given by an expression (N+1)×Θa−Θ0+B. When the value va is higher than or equal to VL and is lower than or equal to VH, the absolute angle A (°) is given by an expression (N+1)×Θa−Θ0.

Another method for measuring the absolute angle A will now be described.

When the value of the second detection signal Vb is included in a flat portion, the absolute angle of the rotation angle is found on the basis of the first detection signal Va and the second detection signal Vb, in a manner similar to the above. When the value of the second detection signal Vb is included in a gradually rising portion, the position in the gradually rising portion at which the second detection signal Vb exists is calculated, and the absolute angle A is found using the calculated value.

In the above embodiment, the first detection signal Va includes sawtooth continuous pulses each having a portion that gradually and linearly rises and a potion that sharply falls within the detection range, and the second detection signal Vb rises stepwise. Alternatively, the first detection signal Va may include sawtooth continuous pulses each having a portion that gradually and linearly falls and a portion that rises sharply, and the second detection signal Vb may falls stepwise.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A rotation-angle detecting device for detecting the absolute angle based on a first detection signal that includes sawtooth continuous pulses, each having a portion that gradually and linearly rises and a portion that sharply falls within a detection range, and a second detection signal that rises or falls stepwise within the detection range, wherein the second detection signal includes, corresponding to the pulses of the first detection signal, a plurality of flat portions and a plurality of gradually rising or falling portions for linking the flat portions, and each of the gradually rising or falling portions corresponds to the sharply falling portion of the first detection signal, and wherein, when the value of the second detection signal is included in any of the flat portions, the absolute angle is found on the basis of the values of the first detection signal and the second detection signal, and, when the value of the second detection signal is included in any of the gradually rising or falling portions, the absolute angle is found on the basis of the value of the first detection signal in conjunction with the value of the second detection signal corresponding to a flat portion preceding or following the gradually rising or falling region.

2. A rotation-angle detecting device according to claim 1, wherein, when the value of the second detection signal is included in a gradually rising or falling portion that links the N-th flat portion and the N+1-th flat portion, the value of the first detection signal is detected corresponding thereto, the absolute angle is found on the basis of an angle set corresponding to the N-th flat portion and an angle set corresponding to the value of the first detection signal when the value of the first detection signal is higher than a predetermined upper threshold, and is found on the basis of an angle set corresponding to the N+1-th flat portion and an angle set corresponding to the value of the first detection signal when the first detection signal is lower than a predetermined lower threshold, and an angle corresponding to the value of the first detection signal is 0 and the angle set corresponding to the N+1-th flat portion is considered as the absolute angle when the value of the first detection signal is equal to the upper threshold or the lower threshold or is therebetween.

3. A rotation-angle detecting device according to claim 2, wherein, when the value of the second detection signal is included in the gradually rising or falling portion that links the N-th flat portion and the N+1-th flat portion, the value of the first detection signal is detected corresponding thereto, and the absolute angle is given by an expression N×Θa−Θ0+B when the value of the first detection signal is higher than the upper threshold, by an expression (N+1)×Θa−Θ0+B when the value of the first detection signal is lower than the lower threshold, and by an expression (N+1)×Θa−Θ0 when the value of the first detection signal is more than or equal to the lower threshold and is less than or equal to the upper threshold, wherein, N is an integer, B represents the angle calculated from the first detection signal, Θa represents the rotation angle range set corresponding to the flat portion, Θ0 represents an arbitrary rotation angle, the upper threshold is an upper threshold of the first detection signal corresponding to the lower end of the gradually rising or falling portion of the second detection signal, and the lower threshold is a lower threshold of the first detection signal corresponding to the upper end of the gradually rising or falling portion of the second detection signal.

4. A rotation-angle detecting device for detecting the absolute angle based on a first detection signal that includes sawtooth continuous pulses, each having a portion that gradually and linearly rises and a portion that sharply falls within a detection range, and a second detection signal that rises or falls stepwise within the detection range, wherein the value of the second detection signal includes, corresponding to the pulses of the first detection signal, a plurality of flat portions and a plurality of gradually rising or falling portions for linking the flat portions, and each of the gradually rising or falling portions corresponds to the sharply falling portion of the first detection signal, and wherein, when the value of the second detection signal is included in any of the flat portions, the absolute angle is found on the basis of the values of the first detection signal and the second detection signal, and, when the value of the second detection signal is included in any of the gradually rising or falling portions, the absolute angle is found on the basis of the value of the second detection signal in the gradually rising or falling portion.

* * * * *